United States Patent
Elwart et al.

(10) Patent No.: US 9,863,777 B2
(45) Date of Patent: Jan. 9, 2018

(54) METHOD AND APPARATUS FOR AUTOMATIC ESTIMATED TIME OF ARRIVAL CALCULATION AND PROVISION

(71) Applicant: Ford Global Technologies, LLC, Dearborn, MI (US)

(72) Inventors: Shane Elwart, Ypsilanti, MI (US); Jeffrey Allen Doering, Canton, MI (US); Timothy Mark Feldkamp, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 723 days.

(21) Appl. No.: 13/775,635

(22) Filed: Feb. 25, 2013

(65) Prior Publication Data

US 2014/0244143 A1    Aug. 28, 2014

(51) Int. Cl.
*G01C 21/34*    (2006.01)
*G01C 21/26*    (2006.01)
*G08G 1/0968*    (2006.01)

(52) U.S. Cl.
CPC ......... *G01C 21/3492* (2013.01); *G01C 21/26* (2013.01); *G08G 1/096844* (2013.01)

(58) Field of Classification Search
CPC ............................ G01C 21/3492; G01C 21/34
USPC ............... 701/414, 416, 426, 450, 468, 533; 340/995.14, 989, 992, 995.1
See application file for complete search history.

(56) References Cited

U.S. PATENT DOCUMENTS

| | | |
|---|---|---|
| 4,937,751 A | 6/1990 | Nimura et al. |
| 5,177,685 A | 1/1993 | Davis et al. |
| 5,220,507 A | 6/1993 | Kirson |
| 5,275,474 A | 1/1994 | Chin et al. |
| 5,291,412 A | 3/1994 | Tamai et al. |
| 5,351,779 A | 10/1994 | Yamashita |
| 5,394,332 A | 2/1995 | Kuwahara et al. |
| 5,406,491 A | 4/1995 | Lima |

(Continued)

FOREIGN PATENT DOCUMENTS

| | | |
|---|---|---|
| CN | 1573296 | 2/2005 |
| DE | 102005029744 | 12/2006 |

(Continued)

OTHER PUBLICATIONS

International Searching Authority, International Search Report and the Written Opinion for the corresponding PCT Application No. PCT/US2009/69668 dated Mar. 4, 2010.

(Continued)

*Primary Examiner* — Thomas G Black
*Assistant Examiner* — Wae L Louie
(74) *Attorney, Agent, or Firm* — Jennifer Stec; Brooks Kushman P.C.

(57) ABSTRACT

A system includes a processor configured to receive information relating to a vehicle location. The processor is also configured to determine one or more filters, based on the received information, for filtering out a plurality of non-specified locations from varied location types. Further, the processor is configured to apply filters for each varied location type to select a plurality of non-specified locations. The processor is also configured to calculate an estimated time of arrival (ETA), for each of the selected locations, and deliver the selected locations and the calculated ETAs to a vehicle.

20 Claims, 4 Drawing Sheets

(56) References Cited

U.S. PATENT DOCUMENTS

| | | |
|---|---|---|
| 5,406,492 A | 4/1995 | Suzuki |
| 5,487,002 A | 1/1996 | Diller et al. |
| 5,578,748 A | 11/1996 | Brehob et al. |
| 5,742,922 A | 4/1998 | Kim |
| 5,767,795 A | 6/1998 | Schaphorst |
| 5,790,973 A | 8/1998 | Blaker et al. |
| 5,802,492 A | 9/1998 | DeLorme et al. |
| 5,848,364 A | 12/1998 | Ohashi |
| 5,901,806 A | 5/1999 | Takahashi |
| 6,005,494 A | 12/1999 | Schramm |
| 6,028,537 A | 2/2000 | Suman et al. |
| 6,101,443 A | 8/2000 | Kato et al. |
| 6,314,369 B1 | 11/2001 | Ito et al. |
| 6,374,177 B1 | 4/2002 | Lee et al. |
| 6,401,034 B1 | 6/2002 | Kaplan et al. |
| 6,424,363 B1 | 7/2002 | Matsuba et al. |
| 6,424,888 B1 | 7/2002 | Sone et al. |
| 6,427,115 B1 | 7/2002 | Sekiyama |
| 6,427,117 B1 | 7/2002 | Ito et al. |
| 6,462,676 B1 | 10/2002 | Koizumi |
| 6,484,092 B2 | 11/2002 | Seibel |
| 6,484,093 B1 | 11/2002 | Ito et al. |
| 6,487,477 B1 | 11/2002 | Woestman et al. |
| 6,532,372 B1 | 3/2003 | Hwang |
| 6,533,367 B1 | 3/2003 | Latamik et al. |
| 6,553,293 B1* | 4/2003 | Hac ................. 701/42 |
| 6,574,538 B2 | 6/2003 | Sasaki |
| 6,574,551 B1 | 6/2003 | Maxwell et al. |
| 6,608,887 B1 | 8/2003 | Reksten et al. |
| 6,625,529 B2* | 9/2003 | Obata et al. ........... 701/41 |
| 6,691,025 B2 | 2/2004 | Reimer |
| 6,791,471 B2 | 9/2004 | Wehner et al. |
| 6,829,529 B2 | 12/2004 | Trefzer et al. |
| 6,834,229 B2 | 12/2004 | Rafiah et al. |
| 6,834,543 B2* | 12/2004 | Kin et al. .............. 73/146 |
| 6,866,349 B2 | 3/2005 | Sauter et al. |
| 6,904,359 B2* | 6/2005 | Jones .............. G06Q 10/08 |
| | | 340/989 |
| 6,904,362 B2 | 6/2005 | Nakashima et al. |
| 6,929,086 B1* | 8/2005 | Husain et al. ......... 180/413 |
| 6,950,743 B2* | 9/2005 | Kainuma ........ G01C 21/367 |
| | | 340/995.1 |
| 6,999,779 B1 | 2/2006 | Hashimoto |
| 7,053,866 B1 | 5/2006 | Mimran |
| 7,082,443 B1 | 7/2006 | Ashby |
| 7,085,641 B2* | 8/2006 | Post, II ................. 701/70 |
| 7,089,110 B2 | 8/2006 | Pechatnikov et al. |
| 7,113,107 B2 | 9/2006 | Taylor |
| 7,136,730 B2* | 11/2006 | Lu et al. ................. 701/36 |
| 7,167,799 B1 | 1/2007 | Dolgov et al. |
| 7,243,134 B2 | 7/2007 | Bruner et al. |
| 7,286,931 B2 | 10/2007 | Kawasaki |
| 7,315,259 B2 | 1/2008 | Sacks |
| 7,316,288 B1* | 1/2008 | Bennett et al. ......... 180/413 |
| 7,369,938 B2 | 5/2008 | Scholl |
| 7,421,334 B2 | 9/2008 | Dahlgren et al. |
| 7,455,142 B2* | 11/2008 | Post, II ................. 180/197 |
| 7,486,199 B2 | 2/2009 | Tengler et al. |
| 7,571,042 B2 | 8/2009 | Taylor et al. |
| 7,626,490 B2 | 12/2009 | Kashima |
| 7,642,901 B2 | 1/2010 | Kato et al. |
| 7,653,481 B2 | 1/2010 | Tramel |
| 7,706,796 B2 | 4/2010 | Rimoni et al. |
| 7,726,360 B2 | 6/2010 | Sato et al. |
| 7,804,423 B2 | 9/2010 | Mudalige et al. |
| 7,818,380 B2 | 10/2010 | Tamura et al. |
| 7,822,380 B2 | 10/2010 | Wu |
| 7,822,546 B2 | 10/2010 | Lee |
| 7,826,945 B2 | 11/2010 | Zhang et al. |
| 7,894,592 B2 | 2/2011 | Book et al. |
| 7,920,969 B2 | 4/2011 | Mudalige et al. |
| 8,121,802 B2 | 2/2012 | Grider et al. |
| 8,145,376 B2 | 3/2012 | Sherony |
| 8,255,120 B2* | 8/2012 | Mikuriya et al. ........ 701/42 |
| 8,290,704 B2 | 10/2012 | Bai |
| 8,494,718 B2* | 7/2013 | Muth et al. ............. 701/42 |
| 2001/0001847 A1 | 5/2001 | Hessing |
| 2002/0087262 A1 | 7/2002 | Bullock et al. |
| 2002/0152018 A1 | 10/2002 | Duckeck |
| 2003/0028320 A1 | 2/2003 | Niitsuma |
| 2003/0036848 A1 | 2/2003 | Sheha et al. |
| 2003/0040866 A1 | 2/2003 | Kawakami |
| 2003/0040868 A1 | 2/2003 | Fish et al. |
| 2003/0158652 A1 | 8/2003 | Friedrichs et al. |
| 2004/0021583 A1 | 2/2004 | Lau et al. |
| 2004/0039523 A1* | 2/2004 | Kainuma .......... G01C 21/367 |
| | | 701/459 |
| 2004/0117108 A1 | 6/2004 | Nemeth |
| 2004/0117113 A1* | 6/2004 | Friedrichs ........... G01C 21/32 |
| | | 701/414 |
| 2005/0085956 A1 | 4/2005 | Losey |
| 2005/0096830 A1* | 5/2005 | Ohta et al. ............... 701/91 |
| 2005/0144573 A1 | 6/2005 | Moody et al. |
| 2005/0159881 A1 | 7/2005 | Furukawa |
| 2006/0025923 A1 | 2/2006 | Dotan et al. |
| 2006/0026335 A1 | 2/2006 | Hodgson et al. |
| 2006/0069504 A1 | 3/2006 | Bradley et al. |
| 2006/0089788 A1 | 4/2006 | Laverty |
| 2006/0145837 A1 | 7/2006 | Horton et al. |
| 2006/0168627 A1 | 7/2006 | Zeinstra et al. |
| 2006/0172745 A1 | 8/2006 | Knowles |
| 2006/0184314 A1 | 8/2006 | Couckuyt et al. |
| 2006/0190164 A1 | 8/2006 | Glaza |
| 2006/0241857 A1 | 10/2006 | Onishi et al. |
| 2006/0282214 A1 | 12/2006 | Wolterman |
| 2007/0005241 A1 | 1/2007 | Sumizawa et al. |
| 2007/0038362 A1 | 2/2007 | Gueziec |
| 2007/0050248 A1 | 3/2007 | Huang et al. |
| 2007/0093955 A1 | 4/2007 | Hughes |
| 2007/0104224 A1 | 5/2007 | Conner et al. |
| 2007/0143013 A1 | 6/2007 | Breen |
| 2007/0143482 A1 | 6/2007 | Zancho |
| 2007/0143798 A1 | 6/2007 | Jira et al. |
| 2007/0198172 A1 | 8/2007 | Sumizawa et al. |
| 2007/0203643 A1 | 8/2007 | Ramaswamy et al. |
| 2007/0203646 A1 | 8/2007 | Diaz et al. |
| 2007/0213092 A1 | 9/2007 | Geelen |
| 2007/0219706 A1 | 9/2007 | Sheynblat |
| 2007/0273624 A1 | 11/2007 | Geelen |
| 2007/0290839 A1 | 12/2007 | Uyeki et al. |
| 2008/0005734 A1 | 1/2008 | Poristoin et al. |
| 2008/0065318 A1 | 3/2008 | Ho |
| 2008/0082260 A1 | 4/2008 | Kimura |
| 2008/0114534 A1 | 5/2008 | Yamazaki et al. |
| 2008/0147305 A1 | 6/2008 | Kawamata et al. |
| 2008/0147308 A1 | 6/2008 | Howard et al. |
| 2008/0162034 A1 | 7/2008 | Breen |
| 2008/0195305 A1 | 8/2008 | Jendbro et al. |
| 2008/0228346 A1 | 9/2008 | Lucas et al. |
| 2008/0303693 A1 | 12/2008 | Link, II |
| 2009/0055091 A1 | 2/2009 | Hines et al. |
| 2009/0063042 A1 | 3/2009 | Santesson et al. |
| 2009/0083627 A1 | 3/2009 | Onda et al. |
| 2009/0143934 A1 | 6/2009 | Motonaga et al. |
| 2009/0164110 A1* | 6/2009 | Basir ............. G01C 21/362 |
| | | 701/117 |
| 2009/0177384 A1 | 7/2009 | Walder |
| 2009/0186596 A1 | 7/2009 | Kaltsukis |
| 2009/0192688 A1 | 7/2009 | Padmanabhan et al. |
| 2009/0196294 A1 | 8/2009 | Black et al. |
| 2009/0216434 A1 | 8/2009 | Panganiban et al. |
| 2009/0228172 A1 | 9/2009 | Markyvech et al. |
| 2009/0254266 A1 | 10/2009 | Altrichter et al. |
| 2009/0259354 A1 | 10/2009 | Krupadanam et al. |
| 2009/0326797 A1 | 12/2009 | Tengler et al. |
| 2009/0326801 A1 | 12/2009 | Johnson et al. |
| 2010/0010732 A1 | 1/2010 | Hartman |
| 2010/0048184 A1 | 2/2010 | Kim |
| 2010/0088018 A1 | 4/2010 | Tsurutome et al. |
| 2010/0088029 A1 | 4/2010 | Hu et al. |
| 2010/0094496 A1* | 4/2010 | Hershkovitz ............ B60L 3/12 |
| | | 701/22 |
| 2010/0094500 A1 | 4/2010 | Jin |
| 2010/0094550 A1 | 4/2010 | Tsurutome et al. |

(56) References Cited

U.S. PATENT DOCUMENTS

| | | | |
|---|---|---|---|
| 2010/0138151 | A1 | 6/2010 | Jang et al. |
| 2010/0174485 | A1 | 7/2010 | Taylor et al. |
| 2010/0191463 | A1 | 7/2010 | Berry et al. |
| 2010/0198508 | A1 | 8/2010 | Tang |
| 2010/0217482 | A1 | 8/2010 | Vogel et al. |
| 2010/0241342 | A1 | 9/2010 | Scalf et al. |
| 2010/0245123 | A1 | 9/2010 | Prasad et al. |
| 2011/0003578 | A1 | 1/2011 | Chen et al. |
| 2011/0004523 | A1 | 1/2011 | Giuli et al. |
| 2011/0028118 | A1 | 2/2011 | Thomas |
| 2011/0046883 | A1 | 2/2011 | Ross et al. |
| 2011/0166774 | A1 | 7/2011 | Schunder |
| 2011/0178811 | A1 | 7/2011 | Sheridan |
| 2011/0221586 | A1 | 9/2011 | Eikelenberg et al. |
| 2011/0238289 | A1* | 9/2011 | Lehmann ............ G01C 21/3438 701/533 |
| 2011/0246016 | A1 | 10/2011 | Vang et al. |
| 2011/0255481 | A1 | 10/2011 | Sumcad et al. |
| 2011/0282576 | A1* | 11/2011 | Cabral ............... G01C 21/3492 701/533 |
| 2012/0004841 | A1 | 1/2012 | Schunder |
| 2012/0029806 | A1 | 2/2012 | Scalf et al. |
| 2012/0029807 | A1 | 2/2012 | Schunder et al. |
| 2012/0041673 | A1 | 2/2012 | Vandivier et al. |
| 2012/0053825 | A1 | 3/2012 | Schunder |
| 2012/0173134 | A1 | 7/2012 | Gutman |
| 2013/0030630 | A1 | 1/2013 | Luke et al. |
| 2013/0110332 | A1* | 5/2013 | Hwang ........................... 701/22 |
| 2014/0244143 | A1* | 8/2014 | Elwart ............... G01C 21/3492 701/117 |

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |
| WO | 2008037471 | 4/2008 |

OTHER PUBLICATIONS

International Searching Authority, The International Search Report and the Written Opinion of the International Searching Authority for the corresponding International Application No. PCT/US2010/23887 dated Apr. 12, 2010.

Patent Cooperation Treaty, International Preliminary Examining Authority, International Preliminary Report on Patentability for the corresponding PCT/US10/23887 dated Apr. 29, 2011.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owners Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

POI Along Route QS, Printed from http://www.tomtomforums.com, printed Jul. 30, 2010.

Difficult POI search in Streets & Trips, printed from http://www.laptopgpsworld.com/3520-difficult-poi-search-streets-tips, printed Jul. 30, 2010.

http://www.rated4stars.com/html/gps-saves-gas.html.

http://www.gps.cx/index.php?c=1&n=493964&i=B001LTHONU&x=GPS_Buddy_FEO1US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

* cited by examiner

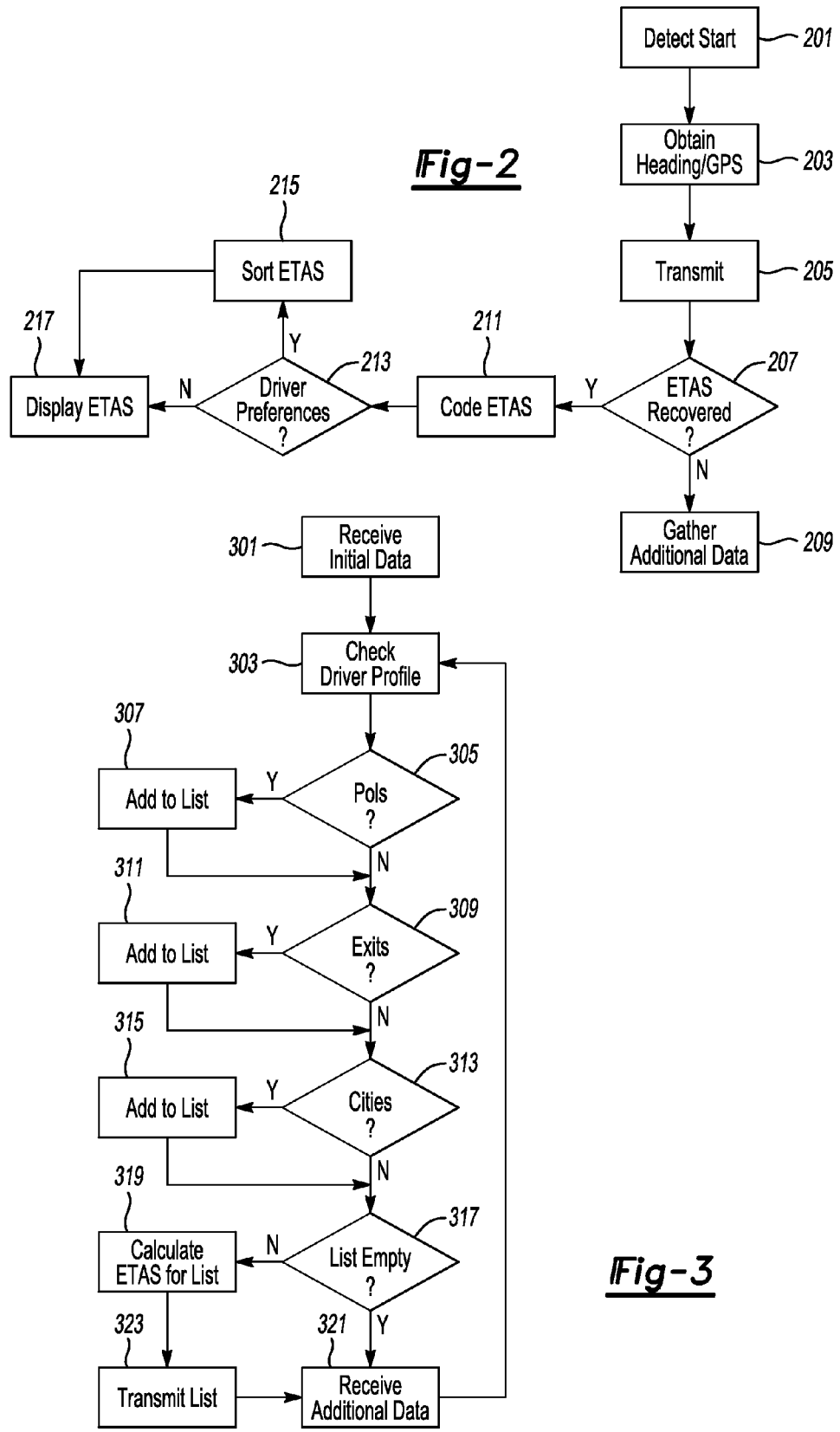

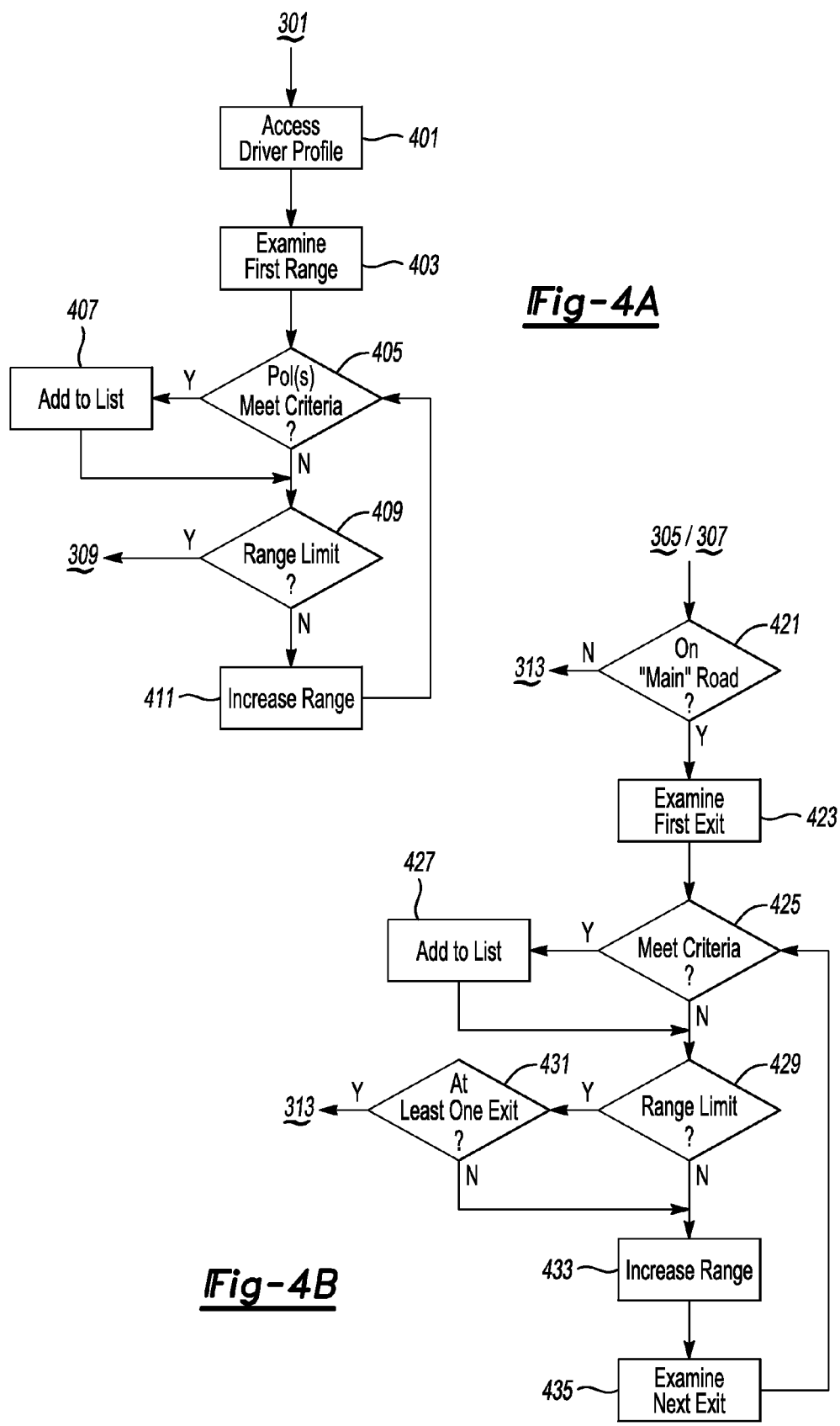

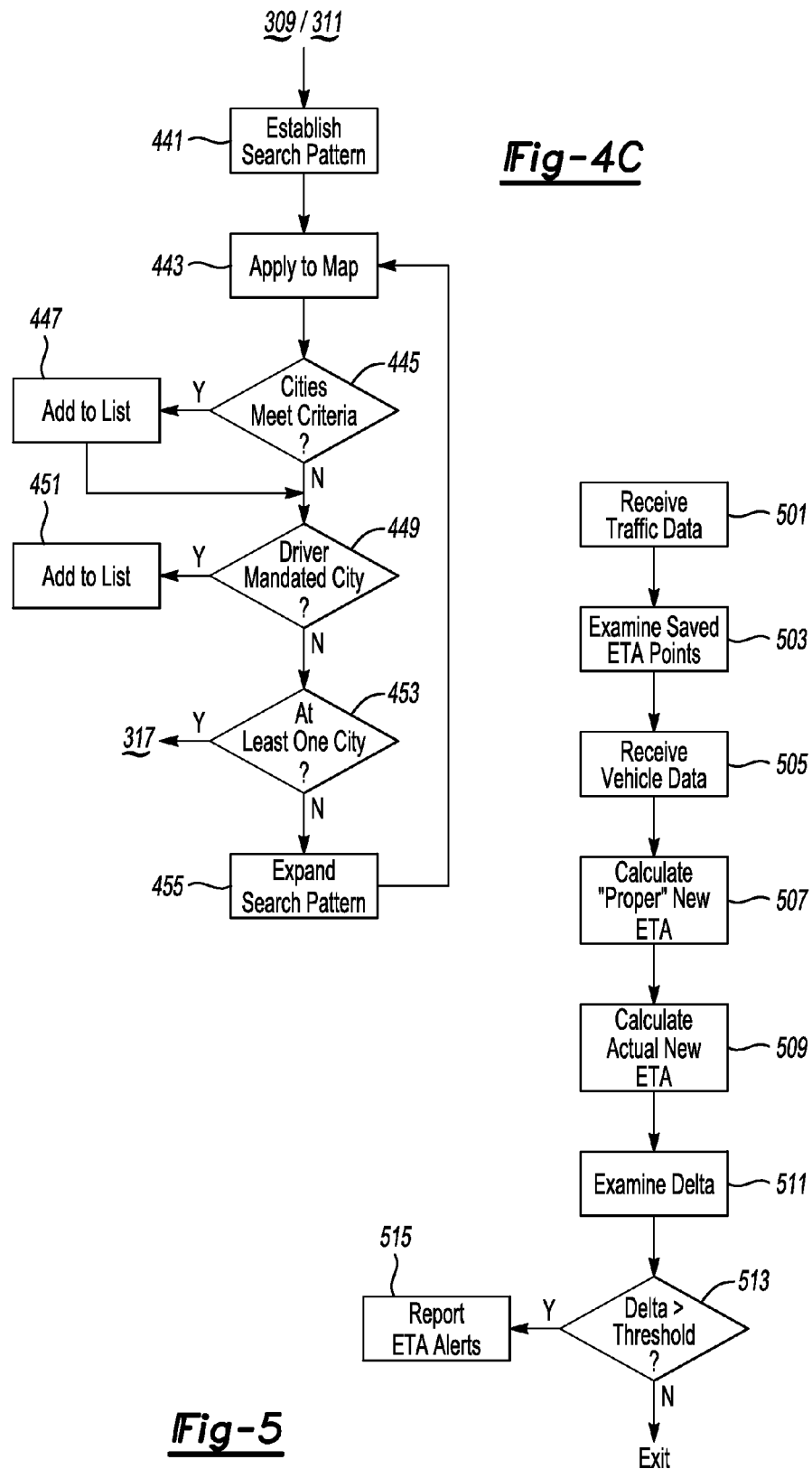

METHOD AND APPARATUS FOR AUTOMATIC ESTIMATED TIME OF ARRIVAL CALCULATION AND PROVISION

TECHNICAL FIELD

The illustrative embodiments generally relate to a method and apparatus for automatic estimated time of arrival calculation and provision.

BACKGROUND

For a long time, motorists traveling along a highway would have to rely on radio reporting to keep them apprised of potential traffic jams. Often the information would come too late, and suddenly a fast-moving highway would slow to almost a dead stop, due to an accident or other traffic-creating situation.

In the interest of aiding drivers, many cities now post digital signs, along the motorways, that indicate estimated traveling times to key off-ramps, other highways and cities of interest. For example, a driver traveling from Northville, Mich. to Detroit, Mich. may see a sign along I-96 that says "estimated time to downtown—85 minutes." If that driver were familiar with the area, then they would know that this means there is at least one significant traffic issue along I-96, because that drive should typically take 30-40 minutes.

Using this information, the driver can attempt to find another route downtown, abort a journey, stop for food (in an attempt to let the traffic clear) or otherwise make their journey more efficient. In the absence of the information, the driver was likely to simply end up another member of the traffic jam, increasing the backup and wasting significant time.

Traffic information is also available to GPS navigation providers, and certain GPS's will provide a driver with traffic information along a current route to a known destination. This information can be used by the driver in deciding whether or not to route around a particular situation.

U.S. Application publication 2011/0238289 generally relates to a navigation device and computer implemented method for predicting the destination of a trip, the method being executed by a navigation device, the method comprising the steps of: determining starting parameters, the starting parameters comprising at least the starting point, starting time and date of the trip, executing a destination prediction algorithm, the destination prediction algorithm taking the starting parameters as input and predicting a destination, wherein the destination prediction algorithm is generated by using information of a trip history; determining, upon arrival at the predicted or another destination, the actual destination.

U.S. Application publication 2004/0117113 generally relates to a method for updating route data stored in a vehicle navigation device, particularly an off-board vehicle navigation device, the route data being updated in response to the occurrence of at least one predetermined event. The method includes transmitting route query data to at least one center when at least one predetermined, traffic-flow-induced event occurs.

SUMMARY

In a first illustrative example, a system includes a processor configured to receive information relating to a vehicle location. The processor is also configured to determine one or more filters, based on the received information, for filtering out a plurality of non-specified locations from varied location types. Further, the processor is configured to apply filters for each varied location type to select a plurality of non-specified locations. The processor is also configured to calculate an estimated time of arrival (ETA), for each of the selected locations, and deliver the selected locations and the calculated ETAs to a vehicle.

In a second illustrative embodiment, a computer-implemented method includes receiving information relating to a vehicle location. The method also includes determining one or more filters, based on the received information, for filtering out a plurality of non-specified locations from varied location types. The method further includes applying filters for each varied location type to select a plurality of non-specified locations. The method additionally includes calculating an estimated time of arrival (ETA), for each of the selected locations, and delivering the selected locations and the calculated ETAs to a vehicle.

In a third illustrative embodiment, a system includes a processor configured to receive a traffic update for traffic between a vehicle location and multiple stored locations. The processor is also configured to calculate updated estimated times of arrival (ETA) for the locations based on the traffic update. The processor is additionally configured to calculate a change to stored ETAs for the locations based on vehicle movement. The processor is further configured to compare differences between the updated ETAs and the changed stored ETAs to alert a driver of updated ETAs for any differences beyond a predefined threshold.

BRIEF DESCRIPTION OF THE DRAWINGS

FIG. 2 shows an illustrative example of an ETA data presentation process;

FIG. 3 shows an illustrative example of an ETA point assembly and information gathering process;

FIGS. 4A-4C show illustrative examples of ETA point determination processes; and FIG. 5 shows an illustrative example of an ETA updating process.

DETAILED DESCRIPTION

Figure 1:
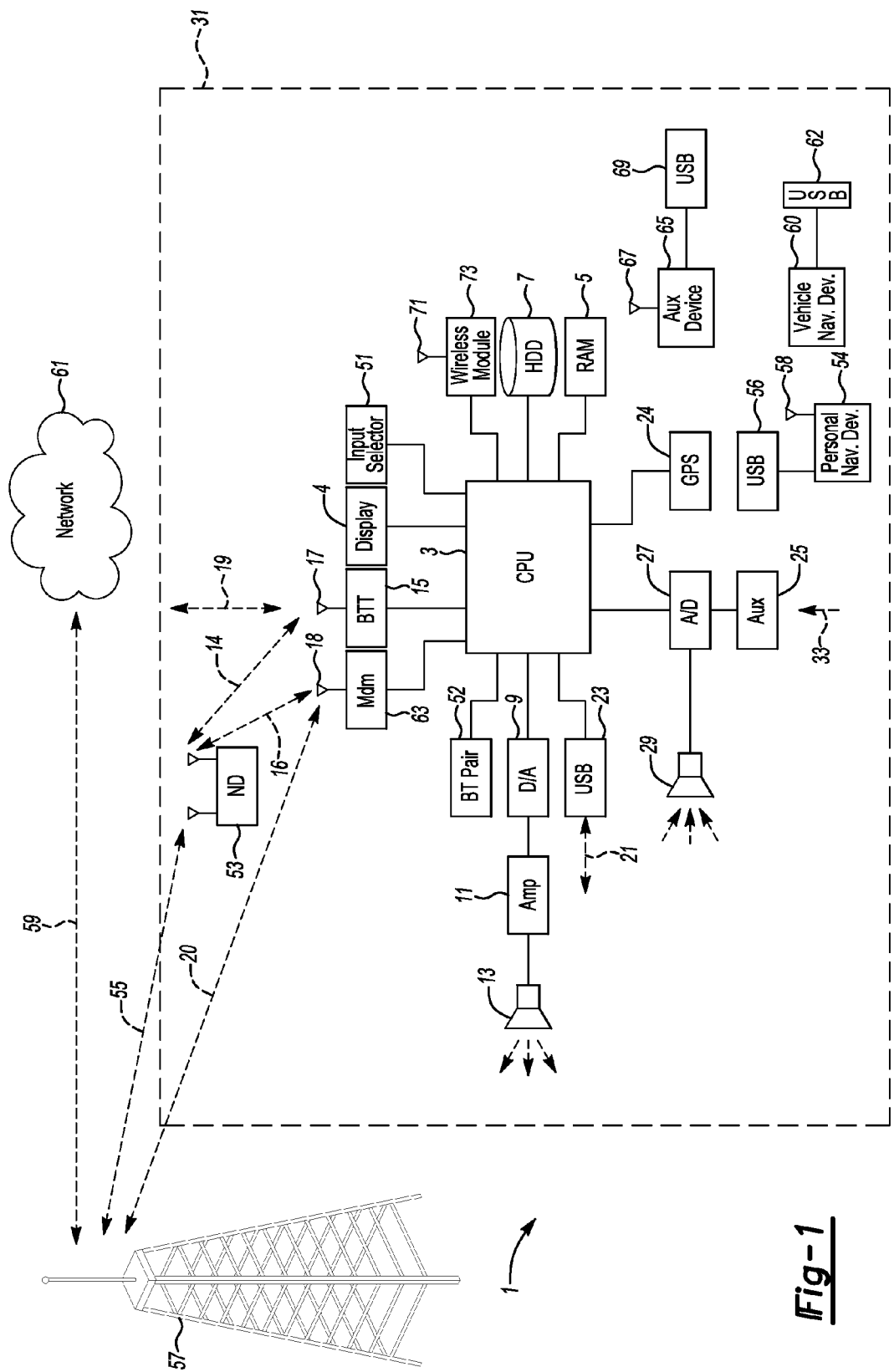
FIG. 1 shows an illustrative vehicle computing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

As has been the case for a while, when a driver inputs a destination into a navigation device, the device can offer the driver an estimated time of arrival (ETA) for the input destination. This offering can even include traffic and other predicted delays, and is quite useful for determining an arrival time at a specific location.

On the other hand, there may be times when a driver would like to know information about a non-destination, or may otherwise find such information to be of use. For example, if a driver were headed south on I-75 from Detroit, Mich., and were notified that it was 30 minutes to I-275 (about halfway to Toledo) and two hours to Toledo, the driver would know that there was a traffic jam somewhere between the I-275 interchange and Toledo. This could help the driver route around an issue, or may cause the driver to abort a planned trip altogether, or take the trip at a different time. Even if an eventual destination is unknown, if a vehicle is headed south on I-75 from Detroit, the above information may be of some use to a driver, as the information refers to both a major interchange and city along that route in that direction.

The illustrative embodiments contemplate presenting ETAs when a destination is unknown, utilizing a variety of factors to present the most likely useful ETAs along a perceived route (e.g. factoring in heading, current location, current road, past behavior, etc.).

FIG. 2 shows an illustrative example of an ETA data presentation process. This is provided as a vehicle-side example, although many steps of this process could be run remote from the vehicle as well. In this illustrative example, the process detects a vehicle startup. Although the process is provided at the inception of a trip in this example, the process could also be provided at any point along a journey.

Once vehicle startup is detected, the process obtains a vehicle heading and GPS coordinates 203. Although not discussed in great detail in this example, known predictive algorithms can be used to predict one or more likely vehicle destinations, even if a destination is not entered. Although, as will be shown by the illustrative examples, a specific destination is not necessary for implementation of the illustrative embodiments. In some cases, ETAs for possible stops, which can be "guessed" based on factors that may vary from driver to driver, can be shown to aid drivers in making traveling decisions.

The heading and GPS coordinates are transmitted 205 to a remote server for processing. If there is sufficient information for the server to present one or more presumably useful ETAs, then the process will responsively receive some number of ETAs 207 from the server. If there is not yet sufficient information, the process may gather additional data.

For example, if a vehicle was started at a place where the driver worked, the process may know that a vehicle start-up between 3 pm and 6 pm, at that location, typically meant a trip in the direction of, if not directly to, a driver's home. In such a case, the mere starting location and time of day may be sufficient to give the ETA presentation engine enough data to begin projecting potentially useful ETAs.

On the other hand, if the vehicle is in a totally unknown location, at 2 pm on a Tuesday, then the ETA prediction/presentation engine may need additional data before it puts out a list of ETAs. Accordingly, in such an instance, for example, the process may wait until a major road or highway is encountered and determine the direction of travel on that road, before presenting information. Then again, if the vehicle is typically driven no more than five miles from a home location, any location within five miles of home may be sufficient, in such a case, to project ETAs to, for example, home, favorite restaurants, favorite stores, etc.

Since the "usefulness factors" may vary from person to person, it may be beneficial to have a driver profile provided to the ETA presentation engine. This is discussed in greater detail with respect to FIG. 3.

Once one or more ETAs has been received, the process can code the ETAs 211, by, for example, category, color, etc. For example, without limitation, in one embodiment, personal ETAs (known possible stops) are one color, street/highway intersections are a second color, and cities/POIs are a third color (or third and fourth). In another example, the color coding may be based on predicted likelihood of usefulness. While not necessary, coding the ETAs in some manner may assist the driver in more quickly identifying information of interest.

The coded ETAs could also be compared against known driver preferences 213. For example, if a driver was less interested in predictions of cross-road ETAs, and more interested in personal and city ETAs, then the system could sort 215 the ETAs and even ignore the cross-road ETAs if so requested. If no driver preferences exist, or once the ETAs are sorted based on preferences, then the process can display one or more ETAs 217.

FIG. 3 shows an illustrative example of an ETA point assembly and information gathering process. In this example, this process is done server-side, although it could be done vehicle-side or on a portable device, assuming sufficient capability was present. In this example, the process first receives any initial data from the vehicle 301 (e.g., without limitation, starting location, heading, vehicle/driver data, etc.).

The process then checks a driver profile 303, in this example, to determine what information may be needed to provide useful ETAs for this particular driver. In some cases a driver profile is stored remotely from the vehicle, and in other cases it may be transmitted with some initial data. In other cases, even if a driver profile isn't present, vehicle data can provide useful information. For example, without limitation, if a low-fuel signal were part of the received data, the system could display projected ETAs to local refueling points.

In this illustrative example, based on the information received, the process checks to see if there are any points of interest 305 that can be identified as being of possible interest to the driver. If so, these points are added to a list of possible ETA locations 307 and the process moves on. Similarly, the process determines if there are appropriate exits/interchanges/intersections 309 and cities 313, and respectively adds any of either that may be of interest to the lists 311, 315.

Although the examples above are limited to POIs, interchanges/exits and cities, any reasonable location type designation may be used. In this illustrative example, if the list is still empty after this process 317, then the process loops and requests additional data 321. In this manner, the process will continue to gather data about a trip until sufficient data is obtained to add at least one presumably useful ETA to a list.

Once the list has at least one ETA location, the process calculates the ETA(s) for the location(s) 319 and transmits the list to the vehicle 323. In this example, the process then loops and continues gathering information, so that other useful ETAs can be presented as they are discovered/become relevant.

FIGS. 4A-4C show illustrative examples of ETA point determination processes. In FIG. 4A, more depth is shown with respect to the POI selection criteria. Again, this is just an example of one possible way of selecting POIs, but the example helps show how different factors may be considered for different criteria.

In this illustrative example, the POI selection process accesses a driver profile 401 to see at what sort of POIs the driver commonly stops. These POIs can include personally save POIs as well as features designated by the system as POIs. In this example, the goal is to show the driver the closes POIs, but other criteria can be used. Accordingly, a first range around a current location is examined 403. In some embodiments, the range may also be directional based on heading, in other examples it may be radial or have other suitable range-type characteristics.

If there are any POI(S) meeting any known criteria for this driver/trip/vehicle 405, the process will add the POIs to the list 407. Then, in this example, the process continues to check if a range limit has been reached 409. Another cap, for example, might be a maximum or minimum number of POIs. If the range limit has not been reached, the process increases the range and looks for POIs again.

It's also possible that the "usefulness" of the POIs could depend on proximity or even on other ETA information. For example, using the Detroit to Toledo instance, if a driver always stops at "touristy" locations, the driver might be made aware that the world's biggest tire is in Allen Park, Mich., with an ETA of fifteen minutes. But, if the driver was more than fifteen minutes away (or a certain distance away), the process may not present this information. In a third iteration, even if the driver was sufficiently far away that the information would not commonly be presented, if the ETA to Toledo were three hours (instead of the regular hour), then such information may again become of interest, as the driver may wish to take a longer than usual detail to see a touristy item, while waiting, for example, for traffic to clear.

In such a manner, it can be seen that varied ETAs can be situationally and personally derived for varied drivers, to the extent that their presentation may even depend on other ETAs. Any suitable factors may be presented for use with the ETAs.

FIG. 4B shows an illustrative example of a selection process for varied exits/interchanges along a route. In this example, the process first checks if the user is on a "main" road 421. For example, if the user is in the middle of a neighborhood, all of the intersections will likely be simple neighborhood streets, and the user may not want to be inundated with a list of 30-60 second ETAs for all proximate intersections. On the other hand, if the user is on a main surface road or highway, the process may examine a first upcoming intersection/exit 423.

In this example, the process moves in a generally heading based direction when examining interchanges, although radial or other examination may be possible. If the first intersection meets criteria for selection 425 (e.g., without limitation, major intersection, commonly used road, etc.), then the process may add the intersection to a list 427.

In this example, provided as a varied way of "stopping" a search, the process stops looking for intersections when a range limit is reached 429 and there is at least one exit listed 431. If there is not at least one cross-road (herein, the words, exit, interchange, cross-road, intersection and like words are all used interchangeably to designate a point where two different roads connect, regardless of road type), the process will continue to expand the range 433 and examine next exits 435 until one is found. In this manner, the driver can be made aware of at least one upcoming exit of interest. The criteria may also shift as the range increases.

FIG. 4C shows an illustrative example of a city selection process. Oftentimes, cities do not lie directly along a current route, but are proximate enough to the route that travel times to the cities are useful measurements of how traffic may be flowing. On the other hand, this information is more useful to a driver if the city and a common travel time is known. Accordingly, unless around a driver's immediate place of work or life, many city travel times may be unknown, as many, many small cities may lie along a route. Larger city travel times, however, may be known regardless of proximity (within reason) to a driver's home/work.

For example, a driver in Northville, Mich., may know that it takes approximately 30-40 minutes to reach Detroit, Mich., approximately 10 minutes to reach Novi, Mich., and may have absolutely no idea how long it takes to reach Ferndale, Mich. (a smaller city than Detroit, approximately 20 miles from Northville). Accordingly, to such a driver, information about smaller cities in close proximity, regardless (to some extent) of size and information about larger cities near a route may both be useful. In this illustrative example, based on driver information or preferences, a search pattern may be established 441. For example, in the Detroit→Toledo example, the process may recognize that this driver has driven this route fifty times in the last year. Accordingly, it is reasonable to "guess" that the driver probably knows at least a few major cities along the route. So it's possible that the process sets a "smaller" city criteria of 50,000 people within 3 miles of the route. Similarly, the process may set a "larger" city criteria of 200,000 people within 40 miles of the route.

Under such criteria, any city having 50,000 people and being within 3 miles of a "guessed" route to Toledo (based in this case on heading and current road/location) would be identified for ETA provision purposes. Similarly, any city of 200,000 within 40 miles of the route may be identified. The process could also search radially for one or more of the criteria. For example, cities of 50,000 could be identified for routes in a 90 degree arc centered about a current heading, whereas larger cities could be identified for routes in a 270 degree arc or even a full circle. These are illustrative examples only, but show how differing criteria for differing city types could be applied.

In this example, following the establishment of criteria, the process may apply the criteria to a map 443. In this example, if any cities are identified as meeting the criteria 445 then they may be added to a list 447. Similarly, if there are any driver-mandated cities (e.g., without limitation, always add "West Bloomfield, Mich." if within 30 miles of West Bloomfield, Mich.) 449, these cities can be added to the list 451.

Again, in this example, the process continues with an expanded range/pattern 455 as long as there are no cities on the list 453. In this example, once at least one city has been added, the process ends, but of course this could be adjusted as required, as with all of the termination and search criteria herein.

As shown in FIG. 3, these and other searches can provide locations for which ETAs can be provided, dynamically, based on drivers and varied situations.

FIG. 5 shows an illustrative example of an ETA updating process. In this illustrative example, one or more ETAs may have already been provided to a driver. If an ETA drastically changes beyond a threshold amount (e.g., traffic develops), the process will update the ETA so that the driver is quickly aware of the situation. Similarly, even if an ETA had not been previously presented to the driver, it may be presented if there is a sudden traffic situation which would make the ETA less than a commonly predicted amount.

In this example, traffic data is received 501 and a list of saved ETA points is examined 503. The saved ETA points correspond to points identified by the system as ETAs of possible use to the driver, in this example. Vehicle data is then also received in this example 505, because the vehicle is often in motion and previously calculated ETA times will change even if there is no traffic (i.e., the vehicle is moving towards/away from a location).

Accordingly, the process then calculates a "proper" new ETA 507. This is the ETA that corresponds to the "correct" ETA for a location, i.e., how much the ETA should have changed based on changes in a vehicle's location, known speed limits/speeds of travel, previous known traffic patterns, etc. The process can then, taking the new traffic pattern (or other delay or clearing thereof) into account, calculate a new actual ETA 509.

The difference between the two ETAs can then be examined 511, and if it is above a threshold 513 then an ETA change alert can be sent to the vehicle 515. Typically, a change above a threshold will indicate that traffic or other delay conditions have appeared or cleared, and so it may be appropriate to notify the driver of the condition change.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive information relating to a vehicle location;
determine a filter, based on the received information, for filtering out a plurality of non-specified destinations from varied location types;
apply the filter for each varied location type to select the plurality of non-specified destinations;
for each of the selected destinations, calculate an estimated time of arrival (ETA); and
deliver the selected destinations and the calculated ETAs to a vehicle.

2. The system of claim 1, wherein at least one filter is based on a driver profile.

3. The system of claim 1, wherein at least one filter is based on a time of day.

4. The system of claim 1, wherein at least one filter is based on a vehicle heading and location.

5. The system of claim 1, wherein a location type is a point of interest.

6. The system of claim 1, wherein a location type is an intersection.

7. The system of claim 1, wherein a location type is a city.

8. The system of claim 1, wherein the received information includes a driver profile or driver identification.

9. A computer-implemented method comprising:
receiving information relating to a vehicle location;
determining one or more filters, based on the received information, for filtering out a plurality of non-specified destinations from varied location types;
applying filters for each varied location type to select the plurality of non-specified destinations;
for each of the selected destinations, calculating an estimated time of arrival (ETA); and
delivering the selected destinations and the calculated ETAs to a vehicle.

10. The method of claim 9, wherein at least one filter is based on a driver profile.

11. The method of claim 9, wherein at least one filter is based on a time of day.

12. The method of claim 9, wherein at least one filter is based on a vehicle heading and location.

13. The method of claim 9, wherein a location type is a point of interest.

14. The method of claim 9, wherein a location type is an intersection.

15. The method of claim 9, wherein a location type is a city.

16. A system comprising:
a processor configured to:
receive a traffic update for traffic between a vehicle location and multiple stored locations;
calculate updated actual estimated times of arrival (ETA) changes for the locations based on the traffic update;
calculate a projected change to stored ETAs for the locations based on vehicle movement;
compare differences between the actual ETAs and the projected ETA changes to alert a driver of any differences beyond a predefined threshold.

17. The system of claim 16, wherein the multiple stored locations include one or more non-destination points of interest.

18. The system of claim 16, wherein the multiple stored locations include one or more non-destination intersections.

19. The system of claim 16, wherein the multiple stored locations include one or more cities.

20. The system of claim 16, wherein the multiple stored locations are all non-destination locations.

* * * * *